United States Patent

Jeong

(10) Patent No.: US 8,740,431 B2
(45) Date of Patent: Jun. 3, 2014

(54) HEAD LAMP SYSTEM COMPRISING A PAIR OF HEAD LAMPS AND METHOD FOR CONTROLLING THE SAME

(75) Inventor: Chang Seob Jeong, Gyeongsangbuk-do (KR)

(73) Assignees: GM Global Technology Operations, LLC, Detroit, MI (US); SL Corporation (KR)

(*) Notice: Subject to any disclaimer, the term of this patent is extended or adjusted under 35 U.S.C. 154(b) by 215 days.

(21) Appl. No.: 13/293,997

(22) Filed: Nov. 10, 2011

(65) Prior Publication Data

US 2012/0286662 A1    Nov. 15, 2012

(30) Foreign Application Priority Data

Nov. 11, 2010    (KR) .......................... 10-2010-0112264

(51) Int. Cl.
 *B60Q 1/00*    (2006.01)
 *F21S 8/10*    (2006.01)

(52) U.S. Cl.
 CPC .............. *F21S 48/14* (2013.01); *F21S 48/145* (2013.01); *F21S 48/1794* (2013.01); *B60Q 1/00* (2013.01)
 USPC .......................................... 362/539; 362/538

(58) Field of Classification Search
 CPC ....... F21S 48/10; F21S 48/1794; F21S 48/13; F21S 48/14; B60Q 1/14
 USPC .................................................. 362/539, 538
 See application file for complete search history.

(56) References Cited

U.S. PATENT DOCUMENTS

| | | | |
|---|---|---|---|
| 5,339,226 A * | 8/1994 | Ishikawa | 362/539 |
| 7,201,505 B2 * | 4/2007 | Sugimoto et al. | 362/539 |
| 7,926,992 B2 * | 4/2011 | Kim et al. | 362/539 |
| 8,459,849 B2 * | 6/2013 | Grimm et al. | 362/539 |
| 2006/0039158 A1 * | 2/2006 | Kurz et al. | 362/539 |
| 2009/0116259 A1 | 5/2009 | Ohshio et al. | |
| 2009/0154187 A1 * | 6/2009 | Kim et al. | 362/539 |
| 2010/0164382 A1 * | 7/2010 | Lee et al. | 315/82 |

FOREIGN PATENT DOCUMENTS

| | | |
|---|---|---|
| DE | 10352950 A1 | 6/2005 |
| DE | 202005010205 U1 | 9/2005 |
| FR | 2891512 A1 | 4/2007 |
| JP | 2000348507 | 12/2000 |
| KR | 1020100079941 A | 7/2010 |

OTHER PUBLICATIONS

European Search Report for corresponding EP 11188113.2. 9 pages. Date: Feb. 13, 2012.

* cited by examiner

*Primary Examiner* — Robert May
(74) *Attorney, Agent, or Firm* — Jansson Munger McKinley & Shape Ltd.

(57) ABSTRACT

Provided are a head lamp system including a pair of head lamps and a method for controlling the same. A head lamp assembly according to the present disclosure includes: a rotation control unit for rotating a head lamp to determine an irradiating direction of the head lamp; a lighting unit provided in the head unit to generate light; a shield unit located at the front of the lighting unit and having a cylindrical shape to be rotatable on a rotary shaft, the shield unit having a plurality of shield protrusions provided on the circumference thereof to partially intercept the light; and a shield operating unit for activating a selected shield protrusion, wherein the plurality of shield protrusions have different shapes from each other, wherein the plurality of shield protrusions include shield protrusion A and shield protrusion B having the same height and having steps which protrude upward and whose starting locations are different from each other.

31 Claims, 32 Drawing Sheets

Fig.2

| tabled requirements expressed in cd | | | passing beam | |
|---|---|---|---|---|
| | | | class W | |
| | No | Element | min | max |
| Part A | 1 | B50L            4/ | | 438 |
| | 2 | HV              4/ | | |
| | 3 | BR              4/ | 125 | 1 875 |
| | 4 | C               4/ | | 3 750 |
| | 5 | Segment BLL | | 625 |
| | 6 | P | 63 | |
| | 7 | Zone III (as specified by Table 3 of this annex) | | 625 |
| | 8a | S50, S50LL, S50RR    5/ | 63    7/ | |
| | 9a | S100, S100LL, S100RR  5/ | 125 | |
| | 10 | 50R | | |
| | 11 | 75R | 15 000 | |
| | 12 | 50V | 7500 | |
| | 13 | 50L | 5000 | 18 750 |
| | 14 | 25LL | 2500 | |
| | 15 | 25RR | 2500 | |
| | 16 | Segment 20 and below it | | 12 500   2/ |
| | 17 | Segment 10 and below it | | 5 000   2/ |
| | 18 | Emax    3/ | 21875 | 50 000   2/ |

(a)

(b)

(c)

(a)

(b)

HEAD LAMP SYSTEM COMPRISING A PAIR OF HEAD LAMPS AND METHOD FOR CONTROLLING THE SAME

CROSS REFERENCE TO RELATED APPLICATION

This application claims priority based on Korean patent application KR 10-2010-0112264, filed Nov. 11, 2010.

FIELD OF THE INVENTION

The present disclosure relates to a head lamp system including a pair of head lamps and a method for controlling the same, and more particularly, to a head lamp assembly including a pair of head lamps and a method for controlling the same, which provides a suitable beam pattern according to driving circumstances or conditions encountered by a vehicle.

BACKGROUND OF THE INVENTION

Generally, a vehicle has a lighting system for the providing a lighting function so that a driver may observe matters in the driving direction in a better way when driving at night and for informing other vehicles or passengers of a driving status of the vehicle. A head lamp, also called a headlight, is a lamp for lighting a forward path as a vehicle advances, and the head lamp is required to have brightness allowing a driver to check an obstacle on a road, 100 meters from the vehicle at night. The standards of such a head lamp vary depending on countries. Particularly, the head lamp beam may irradiate is various directions depending on whether traffic must keep to the right or to the left.

An existing head lamp for a vehicle provides a fixed lighting pattern regardless of road circumstances or situations which may change in various environments. Therefore, a suitable sight may not be ensured when driving fast or in the country where long-distance sight line is needed, when driving in an city setting where the level of reliance on the brightness of the head lamp is relatively low, and when driving in a bad weather where the road wet by rain or snow dazzles or temporarily blinds thereby reducing the sight of the driver.

An adaptive front lighting system (AFLS) has been introduced so that a driver and an opponent or oncoming driver may recognize the front, light or oncoming vehicle more easily. The AFLS is a system which changes width and length of a headlight beam according to driving conditions of a vehicle, road conditions, environmental conditions, and the like. For example, when a vehicle corners slowly at a turn in the road, the AFLS may turn on an additional light. In addition, the brightness of the head lamp may be adjusted so that a driver of a vehicle approaching in the opposite direction may not be dazzled.

In particular, as shown in FIG. 1, there are regulations regarding the intensity of illumination and irradiating range of a high beam and a low beam of right and left head lamps installed on a vehicle for safe driving. The horizontal axis in the graph represents a forward horizontal line, and the vertical axis represents a light axis. The right and left head lamps based on the forward horizontal line represent a right and left angle of an irradiated light distribution region, and the lighting axis which is the vertical axis represents an upper and lower angle. In particular, three regions depicted at the lower end portion of the forward horizontal line have an important meaning in the light distribution regulations. The region marked by Emax is a light distribution region for ensuring a sight about road information, passenger location and passenger information. The region of Segment 10 and 20, located at the lower end portion of Emax, is biased toward an oncoming vehicle on the left from the light axis in comparison to the Emax region. Particularly, when driving in wet weather, the Segment 20 is a light distribution region influencing the sight of a driver of an oncoming vehicle or a preceding vehicle due to reflective glare since the light irradiated from the head lamps are refracted by raindrops falling at the front and/or the reflective surface of water formed on the road by the rain.

Therefore, a so-called in-rain driving mode which prevents the lead lamp of a vehicle from irradiating light to a front region adjacent to the head lamp is demanded. For example, a head lamp assembly which may irradiate light in a class W pattern among various head lamp lighting patterns is desirable. Such a beam pattern for a special light distribution region should satisfy maximum and minimum intensity of illumination regulated by the laws, as shown in FIG. 2. The illumination regulations shown in FIG. 2 represent, for example, maximum and minimum intensity of illumination of a beam pattern of class W, which should be obeyed for vehicles exported to the Europe.

For example, the 18$^{th}$ item "Emax" in the light distribution laws of FIG. 2 requires a higher illumination range (21875 to 50000 candela) in comparison to other light distribution regions so that a driver may surely recognize front road information and right sidewalk information to decrease sudden traffic accidents. In addition, the region of Segment 10 and 20 associated with dazzling of an oncoming vehicle in the rain requires intensity of illumination not higher than 5000 candela or 12500 candela so that dazzling is minimized toward an oncoming vehicle.

Therefore, it is desirable to provide a system which may allow a driver and an opponent driver to recognize the area in front in a better way while satisfying intensity of illumination and light distribution regulated by the laws, by providing a head lamp generating a suitable beam pattern depending on varying road conditions and weather situations.

As described above, the regulations in relation to class W should be satisfied in order to prevent traffic accidents which may occur due to dazzling in the rain. As shown in FIG. 1, the Emax region which should have the maximum brightness and the region of Segment 20 which should have low intensity of illumination to prevent dazzling of an oncoming vehicle in the rain are very adjacent to each other. Therefore, it is technically difficult to fabricate a head lamp assembly satisfying both conditions.

In this regard, in the related art, there has been disclosed a configuration where an additional light intercepting structure B is further provided above an existing light intercepting structure A to selectively intercept the light irradiated forwards, as shown in FIG. 3.

However, since the in-rain driving mode should have a separate light intercepting structure, process costs and construction time increase due to the added component. In addition, as shown in FIG. 4, since the light irradiated forwards is intercepted by the additional light intercepting structure B, a region C where light is not irradiated is generated, which greatly deteriorates observability to the road surface in the front, thereby increasing the risks of traffic accidents.

SUMMARY OF THE INVENTION

The present disclosure is directed to providing a head lamp assembly which may minimize the influence of reflective glare on a preceding or oncoming vehicle when a vehicle runs in the rain, by implementing an in-rain driving mode without a separate light intercepting structure.

The present disclosure is also directed to providing a head lamp assembly which may reduce the risks of traffic accidents by maintaining observability to the road surface in the front when controlling a head lamp in the in-rain driving mode.

The present disclosure is also directed to providing a head lamp assembly which may satisfy both maximum and minimum intensities of illumination regulated in the light distribution law, when the in-rain driving mode is implemented without any additional component.

The objects of the present disclosure are not limited thereto but may expand within the scope recognizable by those having ordinary skill in the art.

In one aspect, a head lamp assembly according to an embodiment of the present disclosure includes: a rotation control unit for rotating a head lamp in the right and left direction to determine an irradiating direction of the head lamp; a lighting unit provided in the head unit to generate light; a shield unit located at the front of the lighting unit and having a cylindrical shape to be rotatable on a rotary shaft, the shield unit having a plurality of shield protrusions provided on the circumference thereof to partially intercept the light; and a shield operating unit for rotating the shield unit to displace the plurality of shield protrusions to desired locations and thereby activate a selected shield protrusion so that a predetermined beam pattern is formed, wherein the plurality of shield protrusions have different shapes from each other, wherein the plurality of shield protrusions include shield protrusion A and shield protrusion B having the same height and having steps which protrude upward and whose starting locations are different from each other.

In another aspect, a method for controlling a head lamp assembly according to an embodiment of the present disclosure includes: determining a beam pattern of a head lamp; determining a shield protrusion corresponding to the beam pattern, from a plurality of shield protrusions; moving the shield protrusion to a predetermined location; adjusting a rotation angle of the head lamp; and adjusting the quantity of light of the head lamp.

Detailed examples of the head lamp assembly and its control method according to embodiments of the present disclosure will be described herein with reference to the drawings.

By using the head lamp assembly according to embodiments of the present disclosure, the in-rain driving mode (class W) may be implemented without any separate light intercepting structure, and so, when a vehicle runs in the rain, the head lamp assembly may minimize the influence of reflective glare on a preceding or oncoming vehicle.

Particularly, when the head lamp is controlled in the in-rain driving mode, the head lamp assembly may maintain recognition against the front road surface, thereby reducing the risks of traffic accidents.

BRIEF DESCRIPTION OF THE DRAWINGS

In order that the advantages of the disclosure will be readily understood, a more detailed description of the disclosure briefly described above will be rendered by reference to specific embodiments that are illustrated in the appended drawings. Understanding that these drawings depict only exemplary embodiments of the disclosure and are not therefore to be considered limiting of its scope, such exemplary embodiments will be described and explained with additional specificity and detail through the use of the accompanying drawings, in which:

FIGS. 1 and 2 are a graph and a table showing the light distribution laws;

FIG. 21 shows the case in which a left head lamp irradiates light, FIG. 22 shows the case in which a right head lamp irradiates light, and FIG. 23 shows the case in which both right and left head lamps irradiate light;

DETAILED DESCRIPTION OF THE INVENTION

Figure 1:
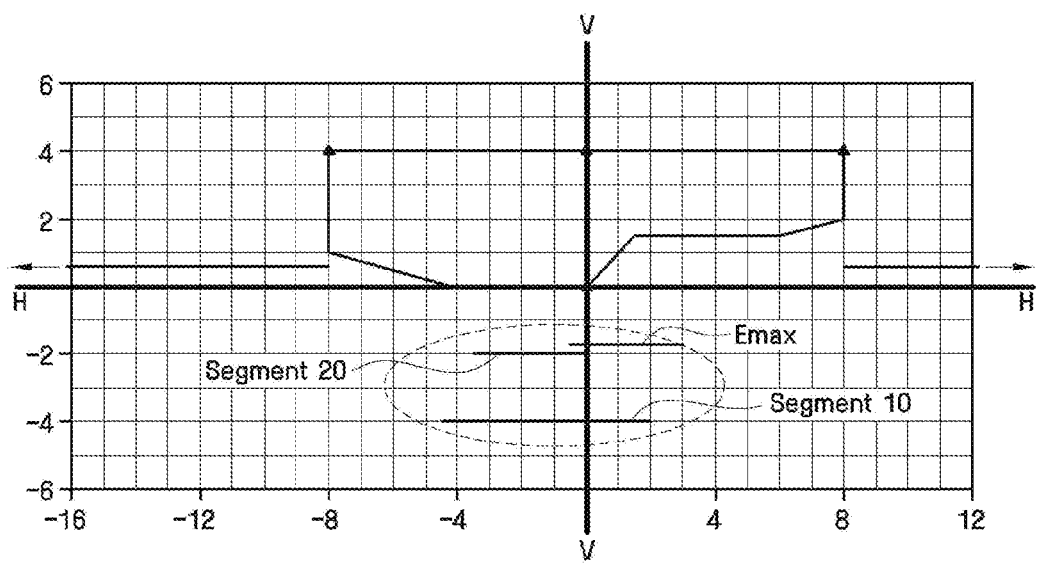
Figure 3:
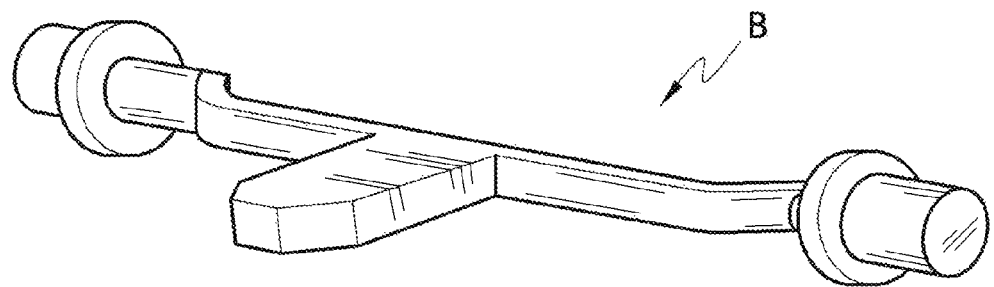
FIG. 3 is a schematic diagram showing a shield assembly structure for implementing a beam pattern of general class W.
Figure 3:
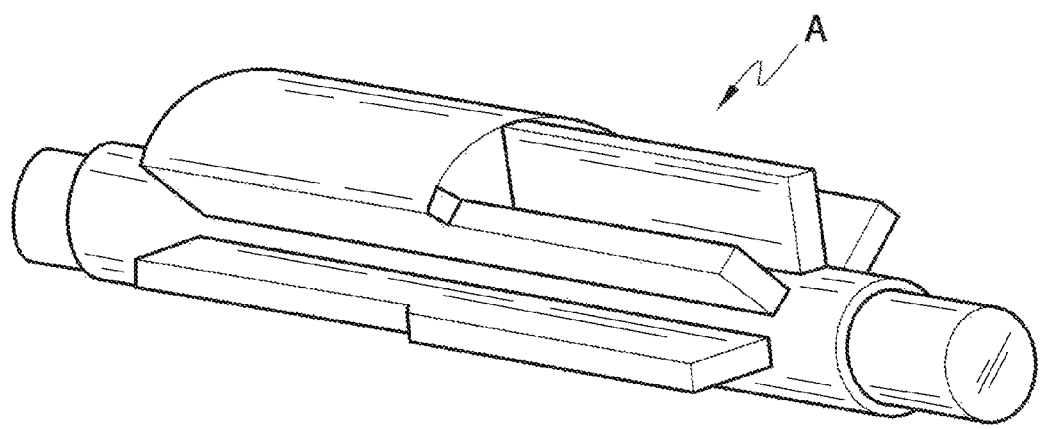
Figure 4:
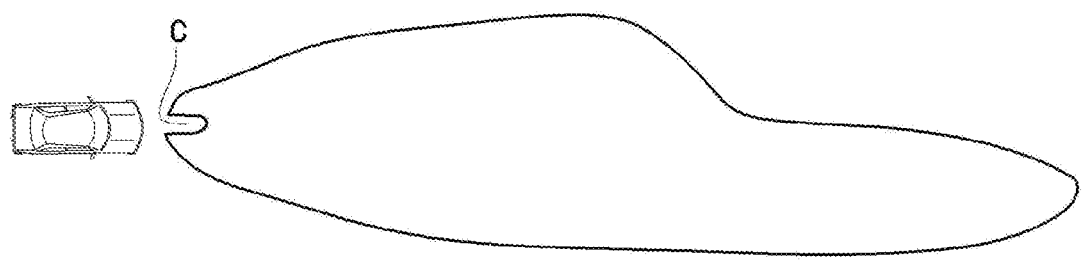
FIG. 4 is a schematic diagram showing a beam pattern of class W implemented according to the structure of FIG. 3.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Hereinafter, embodiments of the present disclosure will be described with reference to the accompanying drawings.

A head lamp assembly according to an embodiment of the present disclosure includes a rotation control unit for rotating a head lamp in the right and left direction to determine an irradiating direction of the head lamp, a lighting unit provided in the head unit to generate light, a shield unit located at the front of the lighting unit and having a cylindrical shape to be rotatable on a rotary shaft, the shield unit having a plurality of shield protrusions provided on the circumference thereof to partially intercept the light, and a shield operating unit for rotating the shield unit to displace the plurality of shield protrusions to desired locations and thereby activate a selected shield protrusion so that a predetermined beam pattern is formed, wherein the plurality of shield protrusions have different shapes from each other, wherein the plurality of shield protrusions include first and second shield protrusions having the same height and having steps which protrude upward and whose starting locations are different from each other.

Figure 5:
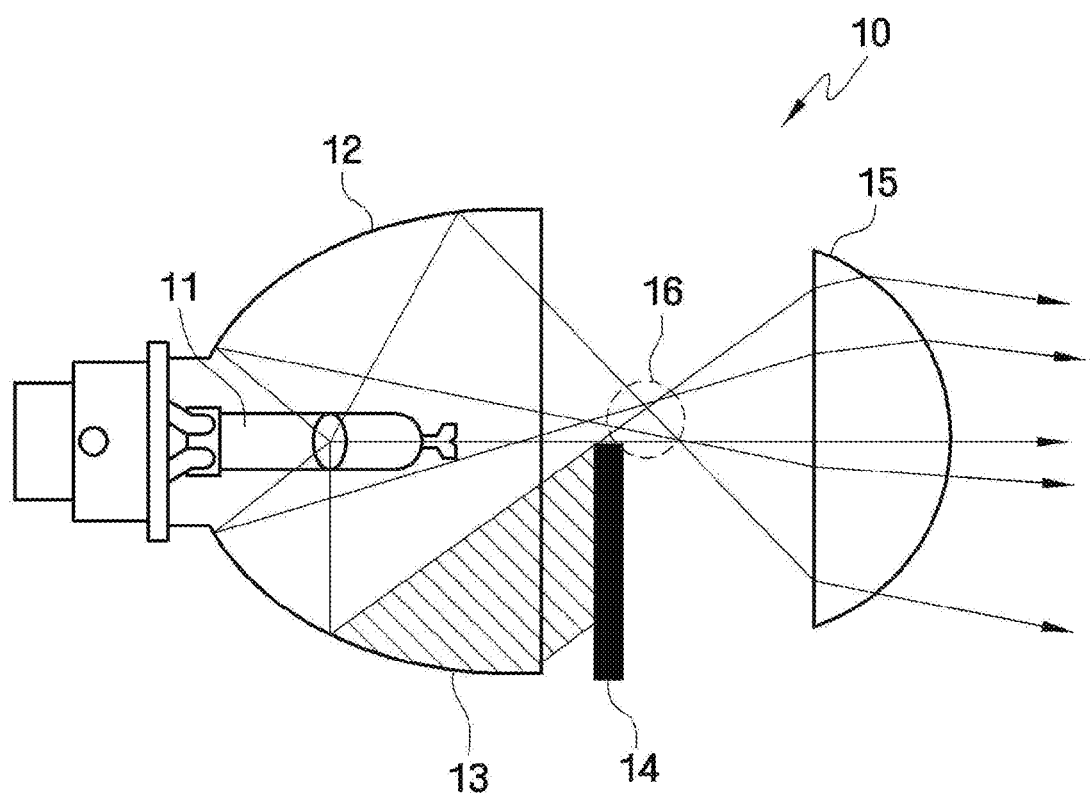
FIG. 5 is a schematic diagram showing a head lamp assembly according to an embodiment of the present disclosure.

FIG. 5 is a schematic diagram showing a head lamp which configures the head lamp 10 assembly according to an embodiment of the present disclosure. Even though FIG. 5 shows a projection-type head lamp 10, the present disclosure is not limited thereto. The projection-type head lamp 10 focuses light on one point and is thus advantageous in aspect of light distribution in comparison to a general clear-type head lamp and gives a sporty appearance at the front surface of a vehicle.

The light emitting from the lighting unit 11 is reflected on a reflective surface 12 of a predetermined shape (for example, an oval shape) and concentrates on a forward one point 16 of the lighting unit 11. The concentrated light is refracted by a lens unit 15 provided at the front and irradiated substantially in the front direction. The lens unit 15 may include a convex lens.

Among the emitting light, the light emitting upward is reflected on the reflective surface 12 and moves downward, and the light emitting downward is reflected on a reflective surface 13 and moves upward. However, except for the case where a high beam is irradiated, the light emitting downward and moving upward is intercepted by shield protrusions of a shield unit 200 so as not to give inconvenience to other drivers. Detailed description of the shield unit 200 will be described later in detail with reference to FIGS. 12 to 19.

The lighting unit 11 may be configured with known light sources such as a high intensity discharge (HID) lamp, a halogen lamp and an LED light source. In addition, the lighting unit 11 may include a discharge valve and a light source emitting light by the discharge valve. The discharge valve may be, for example, a discharge valve such as a metal halide valve, and the lighting unit 11 directly emits light by discharge lighting. The brightness of light irradiated forward may be controlled according to the light power supplied to the lighting unit 11. For example, if the light power supplied to the lighting unit 11 increases by a predetermined energy, the brightness (cd: candela) of the light irradiated from the head lamp may increase accordingly. In the lighting unit 11 of this embodiment, the right and left head lamps are basically supplied with the same light power.

A cover (not shown) passing the penetrating light may be further included at the front of the lens unit 15. The cover configures the outermost surface of the head lamp 10, and plays a role of protecting internal components against external impacts. The cover may be made of transparent material so that the light generated from the lighting unit 11 of the head lamp 10 may penetrate forward.

As described above, in the projection-type head lamp 10, the light reflected on the reflective surface 12 is concentrated on substantially one point 16, different from a clear-type head lamp, and so various beam irradiation patterns may be formed as described later by slightly changing only the shape at and near the one point 16 of the shield unit 200.

FIGS. 6 to 11 are schematic diagrams showing various head lamp beam patterns implemented by the head lamp assembly according to an embodiment of the present disclosure.

Figure 6:
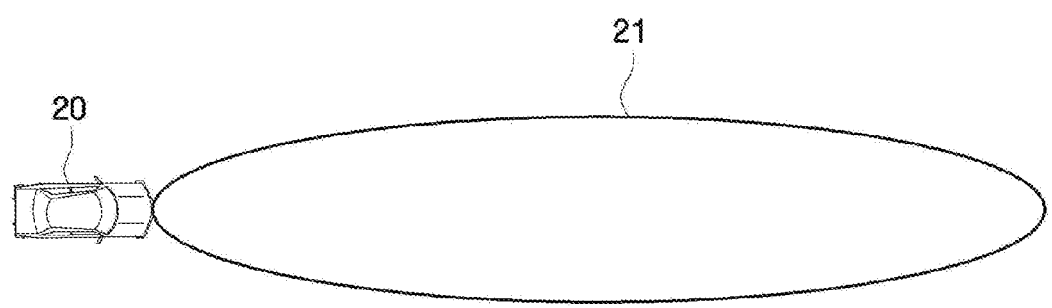
FIGS. 6 to 11 are schematic diagrams showing various head lamp beam patterns implemented by the head lamp assembly according to an embodiment of the present disclosure.

FIG. 6 shows class H. Class H is a beam pattern 21 which is called a high beam irradiating light to a long distance, and this beam pattern is suitable for an environment where a vehicle runs fast with no preceding vehicle.

Figure 7:
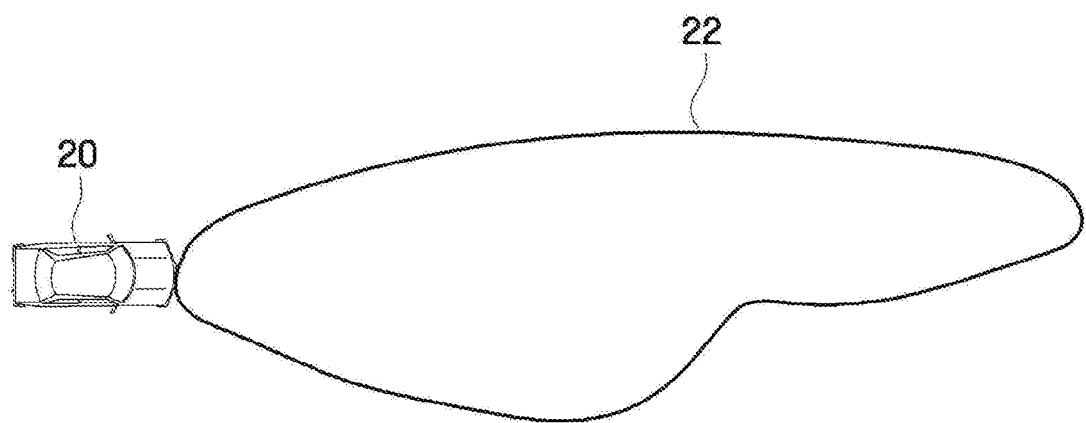

FIG. 7 shows class RHD C. Class RHD C is a beam pattern 22 used when a road driving circumstance changes from right-hand drive to left-hand drive. Therefore, class RHD C has the beam pattern 22 where a beam pattern 30 of class C described later is vertically symmetrical.

Figure 8:
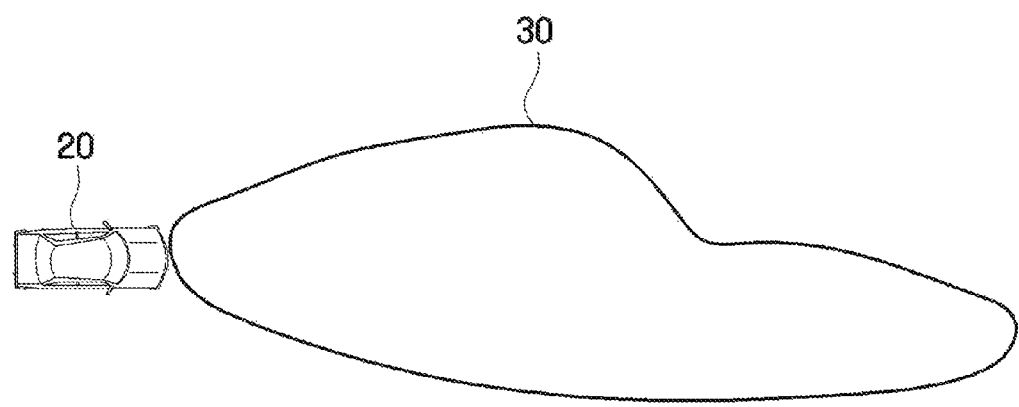

FIG. 8 shows class C. Class C is the beam pattern 30 suitable for the case when a vehicle 20 runs on a country road or when it is not needed to apply a beam pattern of another mode since there is no special situation. Compared with a general low beam, this pattern improves the quality of light while ensuring a sight to an opposite lane.

Figure 9:
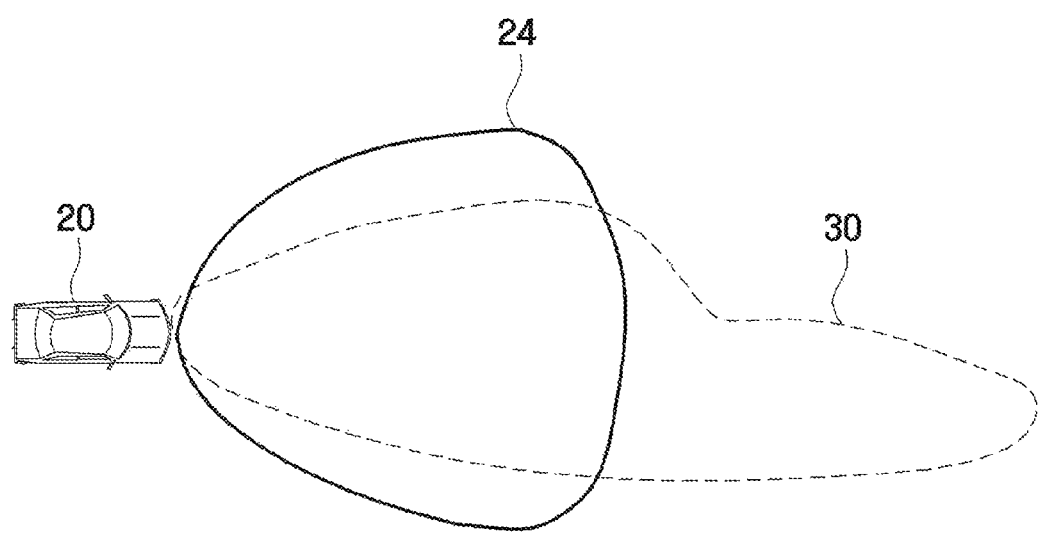

FIG. 9 shows class V. Class V is a beam pattern 24 suitable for the case where the vehicle 20 runs under a circumstance ensuring brightness of surrounding lighting to some extend such as in a downtown or city area, for example the case where the vehicle runs at a speed of 60 km/h or less in a downtown and the road surface has brightness of 1 cd/m$^2$ or above. In particular, the right and left sights become widened in comparison to class C 30, and the sight is ensured for a somewhat shorter distance (about 50 to 60 m to the front) in comparison to class C 30.

Figure 10:
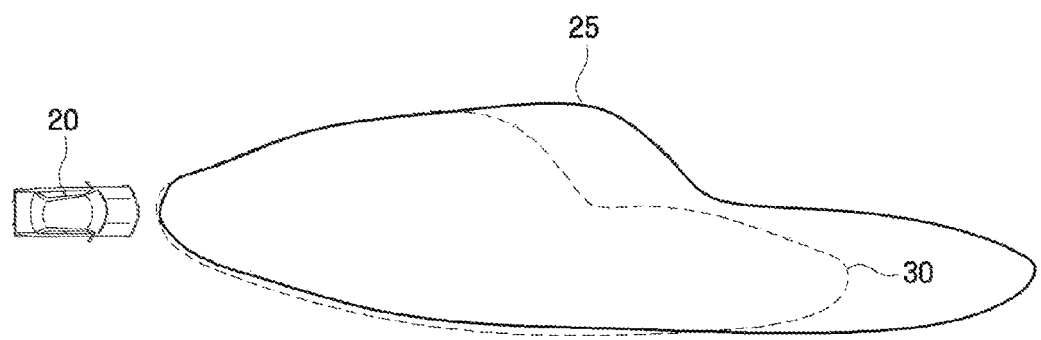

FIG. 10 shows class E. Class E is a beam pattern suitable for the case where the vehicle 20 runs on a highway or on a road which is straight for a significant distance. Therefore, class E 25 gives a somewhat longer sight to the front in comparison to class C 30.

Figure 11:
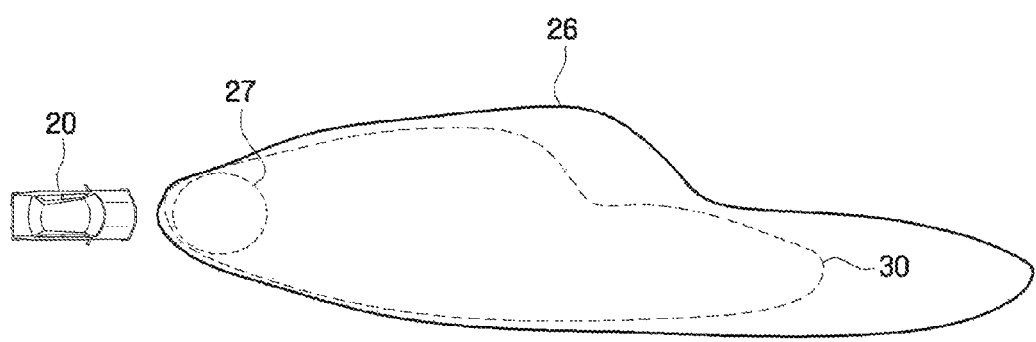

FIG. 11 shows class W. Class W is an in-rain driving mode, which is a beam pattern 26 suitable for the case where the vehicle 20 runs in a rainy weather or on a wet road. Therefore, the long-distance front sight is somewhat similar to class E 25, but the quantity of light rather decreases till near 10 to 20 m in order to reduce reflective glare. Class W may have a beam pattern 26 where a light reflection prevention region 27 is present in a short-distance region at class E 25, and class E and W may be implemented simultaneously by using a single shield protrusion as described later.

As described above, when the head lamp irradiates light, as shown in FIGS. 6 to 11, the actual vehicle 20 needs to change a beam pattern variously according to various driving circumstances. It is possible to generate various beam patterns by changing the shield unit 200.

Figure 12:
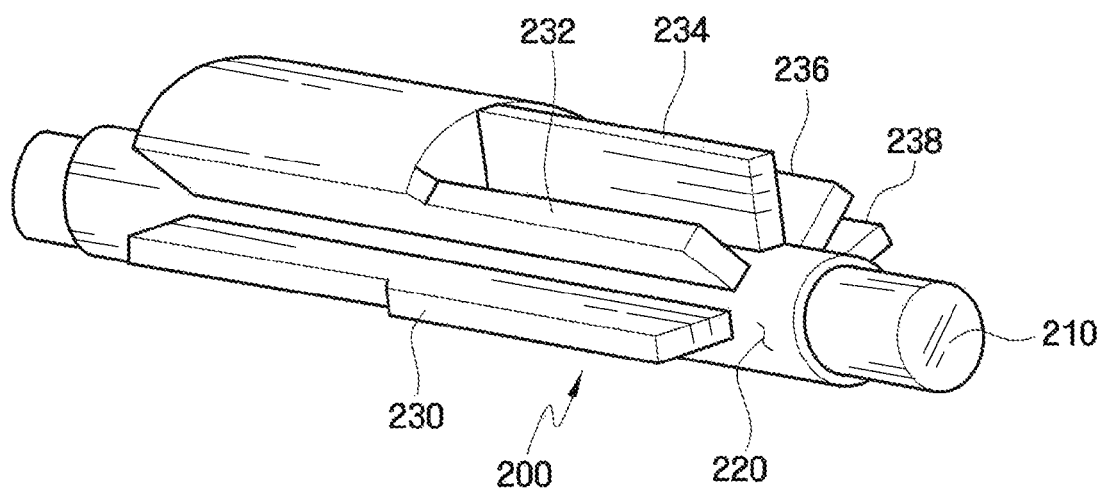
FIG. 12 is a perspective view showing a shield unit of the head lamp assembly according to an embodiment of the present disclosure.
Figure 13:
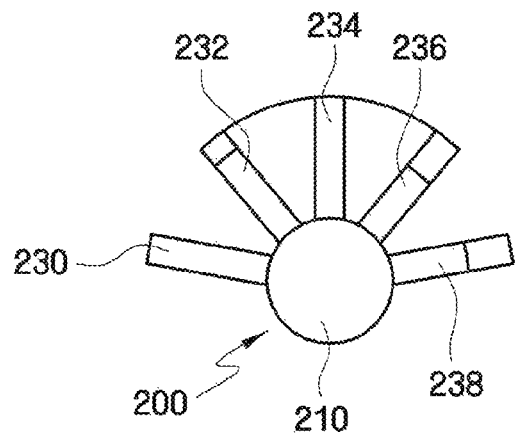
FIGS. 13a to 13c are right side views showing the shield unit of FIG. 12.
Figure 13:
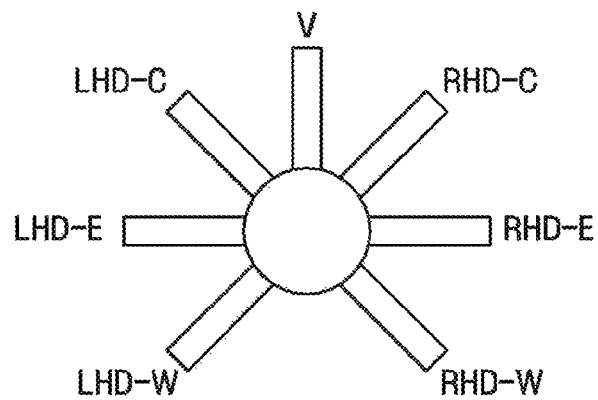
Figure 13:
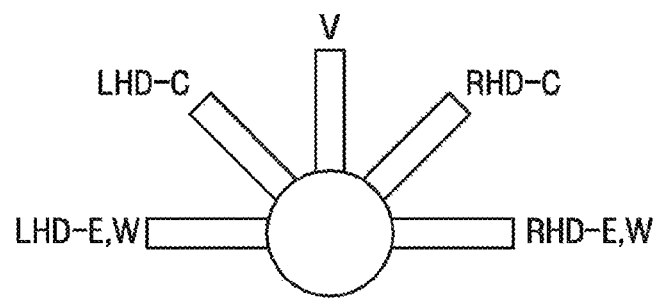

FIG. 12 is a perspective view showing the shield unit of head lamp assembly according to an embodiment of the present disclosure, and FIGS. 13*a* to 13*c* are right side views showing the shield unit of FIG. 12. As described above, the shield unit 200 is located at the front of the lighting unit 11 to give beam patterns shown in FIGS. 6 to 11.

The shield unit 200 may include at least one shield protrusions 230, 232, 234, 236 and 238 on a cylindrical outer circumference 220. The shield protrusions may be patterned to have different shapes and numbers according to a beam pattern to be generated. The shield protrusions may be located separately according to the angle of the cylindrical outer circumference, or some shield protrusions 232, 234 and 236 may be partially merged so that only some shield protrusions are formed separately as shown in the figures. In other cases, some shield protrusions 230 and 238 may be formed separately as shown in the figures.

In addition, the shield unit 200 of this embodiment may be configured to be commonly used for both right-hand drive (RHD) countries and left-hand drive (LHD) countries. In other words, as shown in FIG. 13*b*, shield protrusions corresponding to class C (LHD-C), class E (LHD-E), and class W (LHD-W) useable in LHD countries may be formed at one side based on class V independent from the driving direction, and shield protrusions corresponding to class C (RHD-C), class E (RHD-E), and class W (RHD-W) useable in RHD countries may be formed at the other side. Since class W and class E have similar beam patterns, the shield protrusion corresponding to class W and the shield protrusion corresponding to class E may be implemented as a single shield protrusion LHD-EW, RHD-EW as shown in FIG. 13*c* without being separately formed. As described above, the shield unit 200 of this embodiment may suitably implement a beam pattern under all road running conditions regardless of RHD and LHD.

The shield unit 200 may be operated by a shield protrusion 230, 232, 234, 236 and 238 located at the uppermost portion on the vertical line based on a rotary shaft 210. For example, a third shield protrusion 234 may be located on the vertical line of the rotary shaft as shown in FIG. 12 to form a beam pattern of class V. In other cases, the shield unit 200 may be rotated based on the rotary shaft 210 to "activate" the first shield protrusion 230, the second shield protrusion 232 or the fifth shield protrusion 238 so that the shield unit 200 is operated. Here, "activate" means that the shield protrusion attached to the cylindrical outer circumference 220 is located at the uppermost portion on the vertical line and intercepts a part of light irradiated forward. For example, FIG. 13*a* shows a status where the shield protrusion 234 is located at the uppermost portion and activated.

As described above, if the shield unit 200 is rotated based on the rotary shaft 210, the shield protrusions 230, 232, 234, 236, and 238 attached to the shield unit 200 are activated in order so that the generated beam pattern may vary, and the plurality of shield protrusions may be disposed in a direction (the horizontal direction in FIG. 12) parallel to the length direction of the shield unit 200 on the circumferential surface of the shield unit 200. The detailed beam patterns are already described above with reference to FIGS. 6 to 11.

Meanwhile, the shield unit 200 is rotated by a predetermined angle by the shield operating unit (not shown) to activate each shield protrusion. In other words, the head lamp assembly according to an embodiment of the present disclosure may include a shield operating unit for rotating the shield unit 200 to form a predetermined beam pattern so that the plurality of shield protrusions are displaced to desired locations to activate a selected shield protrusion 230, 232, 234, 236 and 238. The shield operating unit may be provided at one side in the length direction (horizontal direction) of the shield unit 200 shown in FIG. 12, and the shield operating unit may further include a driving unit for providing a driving force. The driving unit may use a step motor capable of rotating by a rotation angle as desired by a user. In addition, an AC servo motor, DC servo motor or the like may also be used. Further, the shield operating unit may further include a driving gear unit for transmitting the driving force generated by the driving unit to the shield unit.

FIGS. 14 to 19 are schematic diagrams for illustrating operations of the shield unit according to an embodiment of the present disclosure which respectively correspond to the beam patterns of FIGS. 6 to 11. When describing this embodiment, even though FIGS. 14 to 19 depict the case where a single shield protrusion corresponds to a single beam pattern, class E and class W having similar beam patterns may correspond to a single shield protrusion as described above, and in this case, the separate fifth shield protrusion 238 may be excluded.

Figure 14:
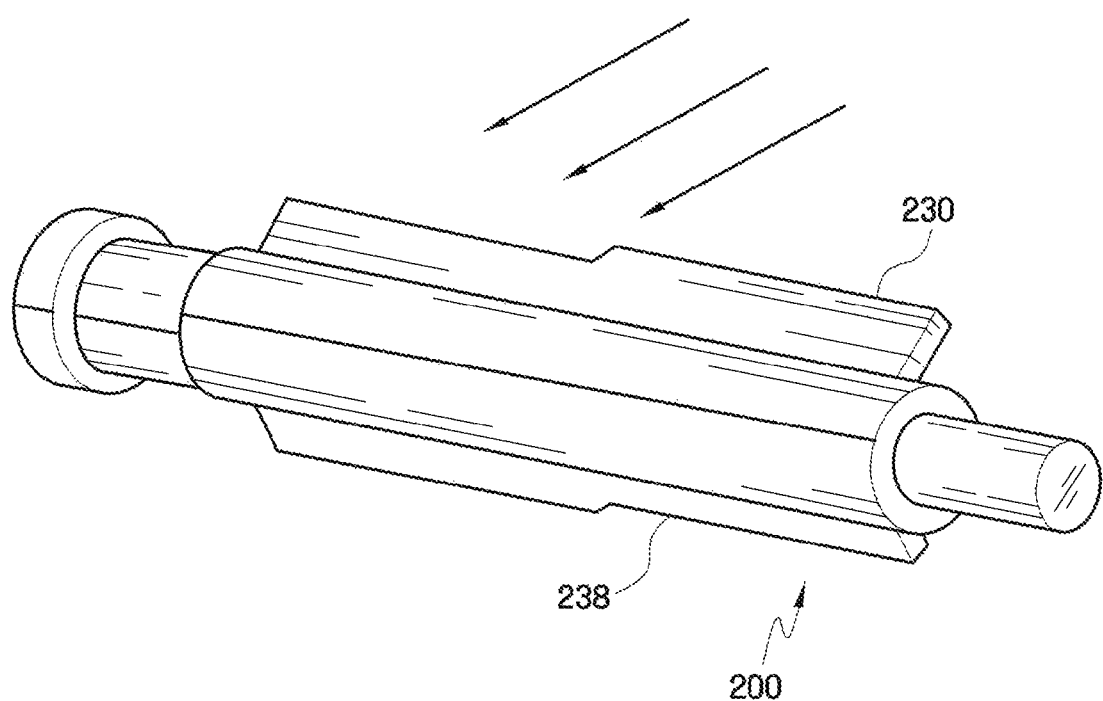
FIGS. 14 to 19 are schematic diagrams showing operations of the shield unit according to an embodiment of the present disclosure, which respectively correspond to the beam patterns of FIGS. 6 to 11.

FIG. 14 shows a status of the shield unit 200 which forms a beam pattern of class H according to an embodiment of the present disclosure. The beam pattern of class H is a beam pattern generating a general high beam, and in this status, any of the shield protrusions 230, 232, 234, 236 and 238 of the shield unit 200 is not yet "activated." Therefore, the light advancing forward through the reflective surface 12, 13 may form the beam pattern of class H which illuminates light a long distance without being intercepted by the shield unit 200.

Figure 15:
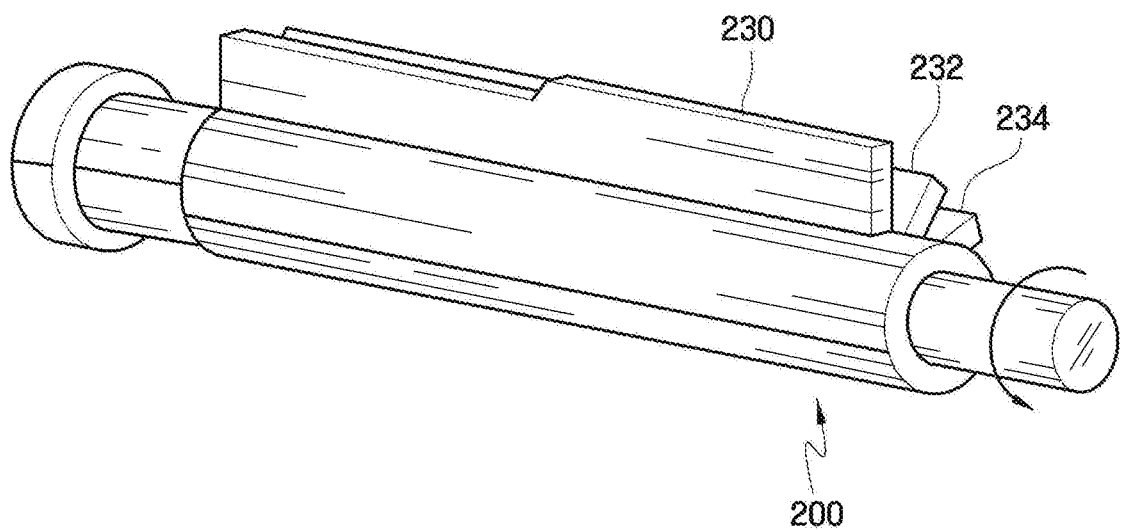

FIG. 15 shows a status of the shield unit 200 which forms a beam pattern of class RHD C according to an embodiment of the present disclosure. The beam pattern of class RHD C may be generated as the first shield protrusion 230 of the shield unit 200 is "activated." The first shield protrusion 230 of the shield unit 200 may be 'activated' by rotating the shield unit 200, which is disposed to form a beam pattern of class H, in a counterclockwise direction so that the first shield protrusions 230 stands vertically. Therefore, the light preceding forward may form a beam pattern of class RHD C while being partially intercepted by the shield protrusion 230.

Figure 16:
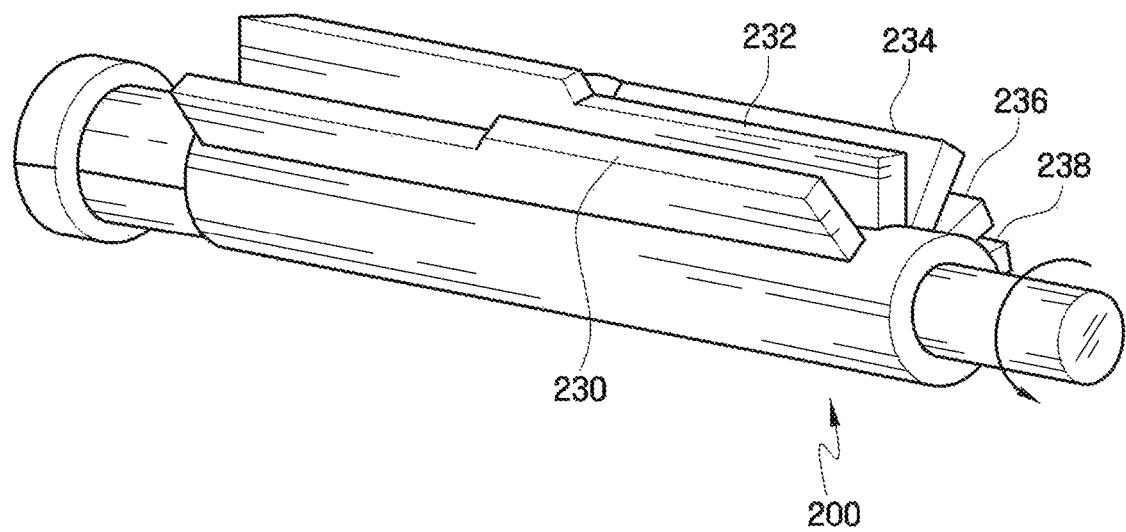
Figure 17:
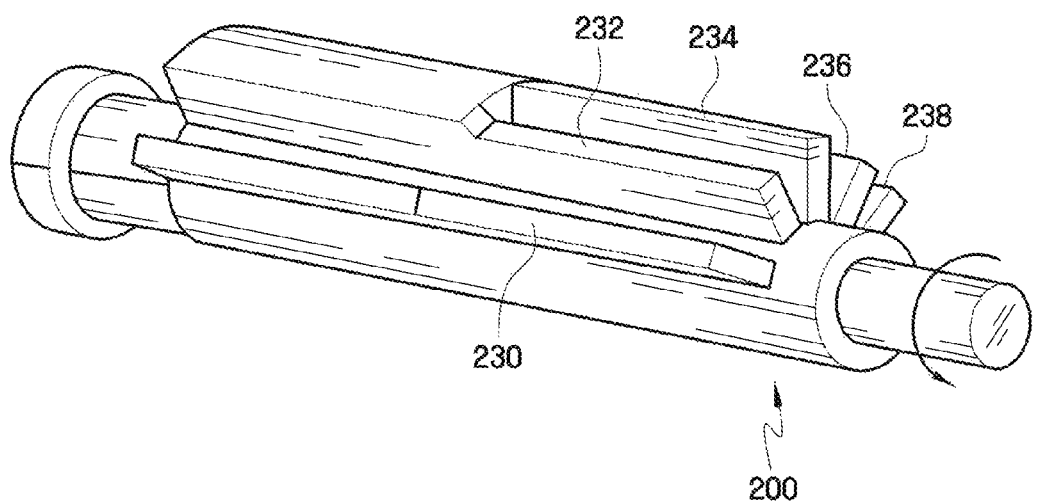

FIG. 16 shows a status of the shield unit 200 which forms a beam pattern of class C according to an embodiment of the present disclosure. The beam pattern of class C may be generated as the second shield protrusion 232 of the shield unit 200 is "activated." The second shield protrusion 232 of the shield unit 200 may be activated by rotating the shield unit 200, which has a first shield arrangement forming a beam pattern of class RHD C, in a counterclockwise direction so that the second shield protrusion 232 stands vertically. The light irradiated forward may form a beam pattern of class C while being partially intercepted by the second protrusion 232. FIG. 17 shows a status of the shield unit 200 which forms a beam pattern of class V according to an embodiment of the present disclosure. The beam pattern of class V may be generated as the third shield protrusion 234 of the shield unit 200 is "activated." The third shield protrusion 234 of the shield unit 200 may also be activated by rotating the shield unit 200, which is disposed to form a beam pattern of class C, in a counterclockwise direction. The light irradiated forward by the third shield protrusion 234 may form a beam pattern of class V while being partially intercepted by the third shield protrusion 234.

Figure 18:
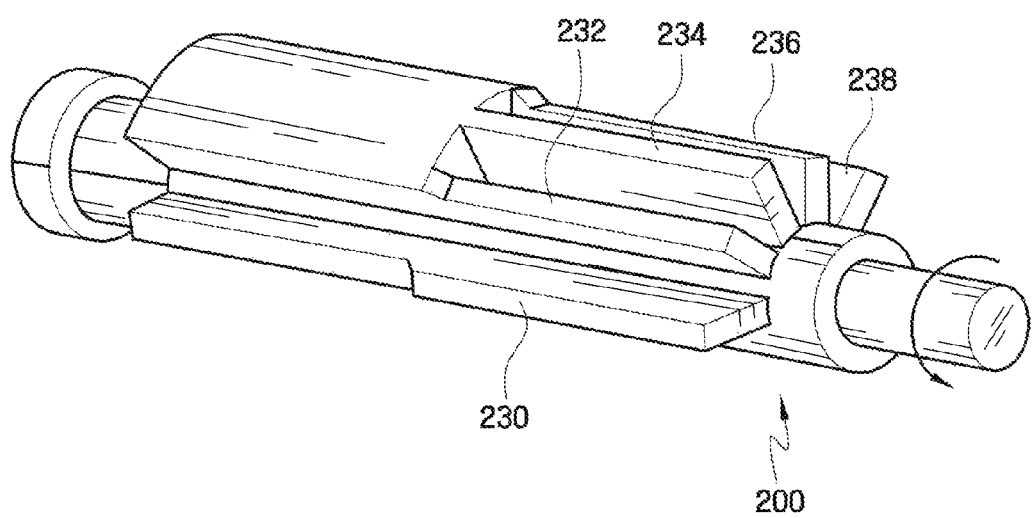

FIG. 18 shows a status of the shield unit 200 which forms a beam pattern of class E according to an embodiment of the present disclosure. The beam pattern of class E may be generated as the fourth shield protrusion 236 of the shield unit 200 is "activated." The fourth shield protrusion 236 of the shield unit 200 stands vertically to be located at the uppermost portion of the shield unit 200 so that the light irradiated forward may be partially intercepted by the fourth shield protrusion 236. Therefore the beam pattern of class E may be formed.

The rotation angle of the shield unit 200 may vary according to the arrangement of the shield protrusions attached to the shield unit 200, and for example, the shield unit 200 may be rotated in a counterclockwise direction each 45 degrees, as shown in FIGS. 14 to 18.

Figure 19:
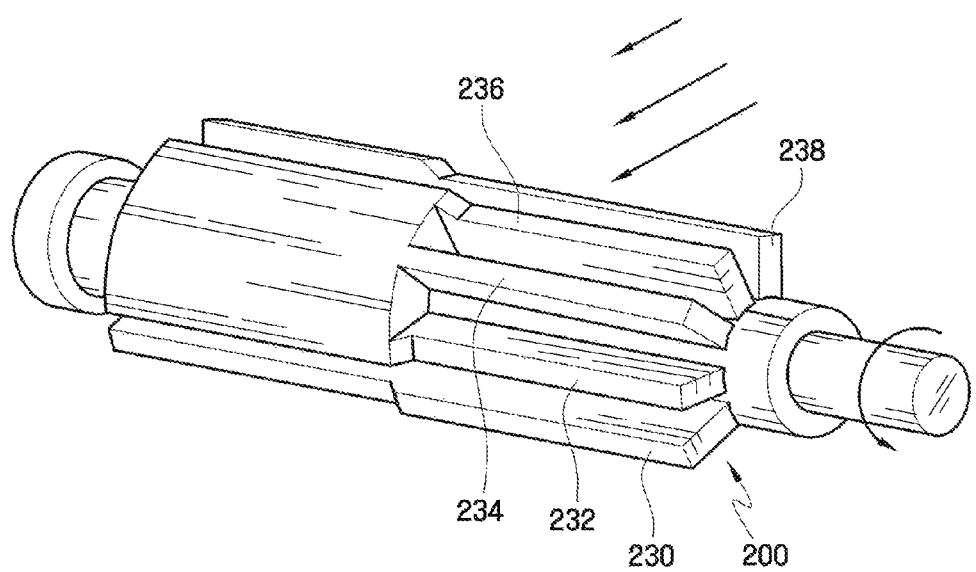
Figure 20:
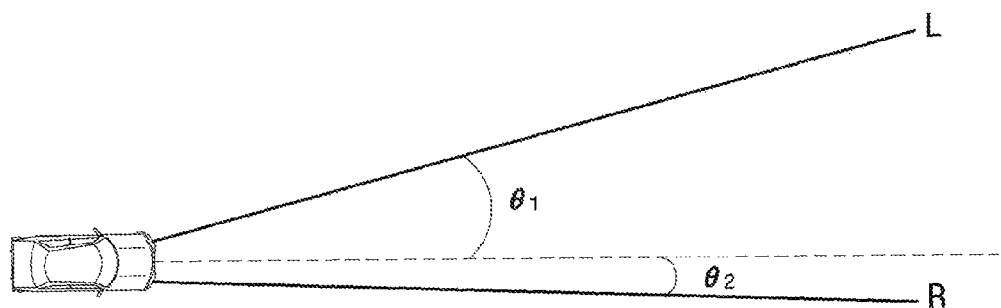
FIG. 20 is a schematic diagram showing a rotation angle of the head lamp assembly according to an embodiment of the present disclosure for implementing the beam pattern of class W.
Figure 21:
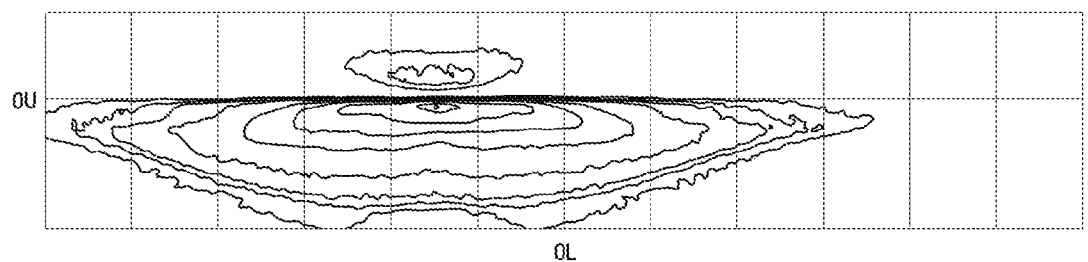
FIGS. 21 to 23 are schematic diagrams showing light irradiation regions and distribution of light irradiation obtained by the head lamp assembly according to an embodiment of the present disclosure, where
Figure 22:
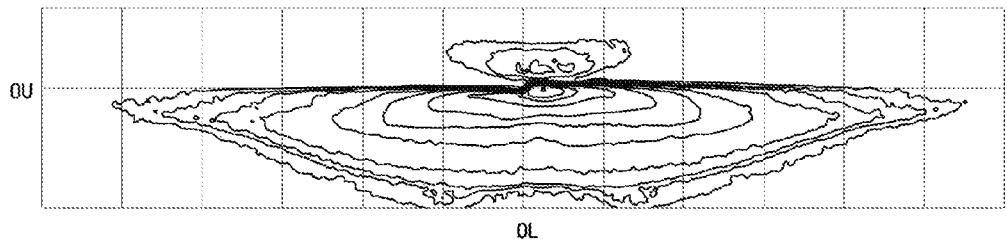
Figure 23:
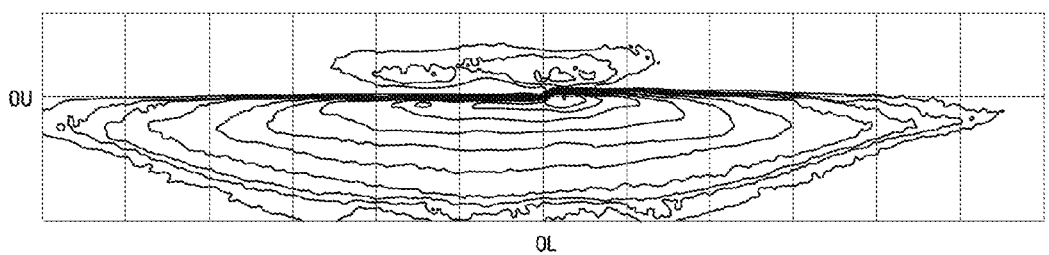
Figure 24:
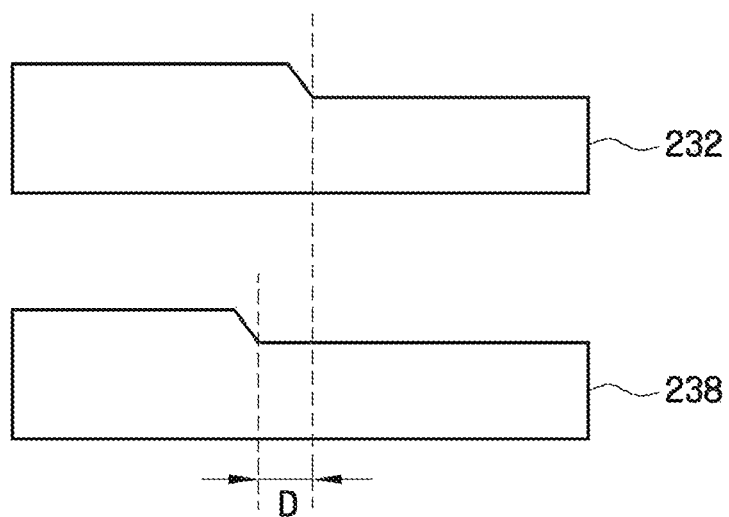
FIG. 24 is a schematic diagram comparatively showing shield protrusions of class C and class W, among shield protrusions of the shield unit of the head lamp assembly according to an embodiment of the present disclosure.
Figure 25:
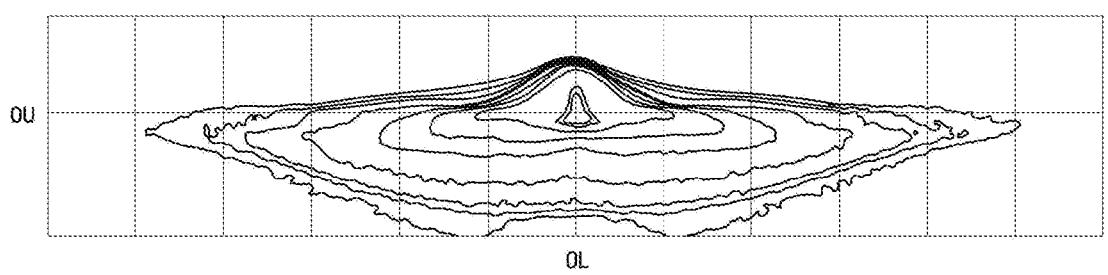
FIGS. 25 to 27 are schematic diagrams for illustrating a light distribution region additionally irradiated by the configuration of FIG. 24.
Figure 26:
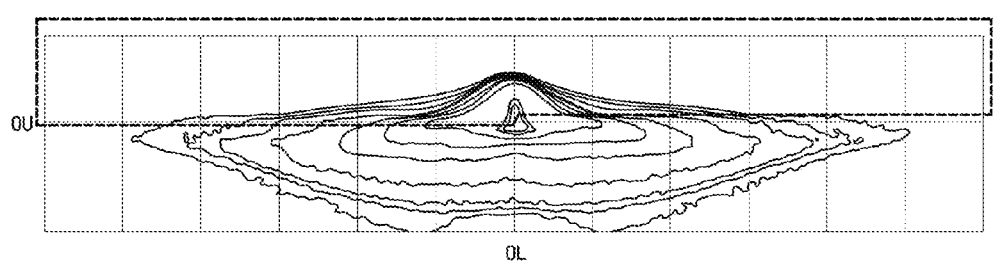
Figure 27:
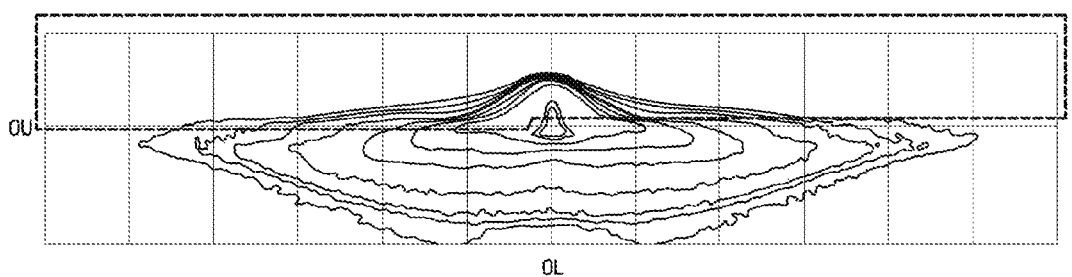
Figure 28:
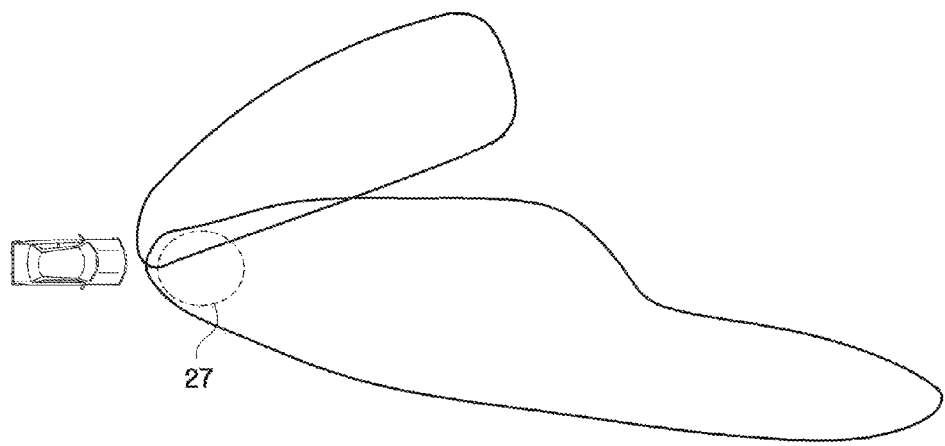
FIG. 28 is a schematic diagram showing a beam pattern of class W implemented by the head lamp assembly according to an embodiment of the present disclosure.

Hereinafter, the principle of forming a beam pattern of class W of the head lamp assembly according to an embodiment of the present disclosure will be described with reference to FIGS. 19 to 28. FIG. 19 shows a status of the shield unit 200 which forms a beam pattern of class W, namely a beam pattern reducing the quantity of light in a near region in the case where a vehicle runs in the rain or the road surface is wet by rain or the like so that the light irradiated from the head lamps are reflected by the water collected on the road surface to cause serious dazzling to a driver of a preceding vehicle or an oncoming vehicle. FIG. 20 is a schematic diagram showing a rotation angle of the head lamp assembly according to an embodiment of the present disclosure in order to implement a beam pattern of class W. FIGS. 21 to 23 are schematic diagrams showing light irradiation regions and distribution of light irradiation obtained by the head lamp assembly according to an embodiment of the present disclosure, where FIG. 21 shows the case in which a left head lamp irradiates light, FIG. 22 shows the case in which a right head lamp irradiates light, and FIG. 23 shows the case in which both right and left head lamps irradiate light. FIG. 24 is a schematic diagram comparatively showing shield protrusions 232 and 238 of class C and class W, among the shield protrusions of the shield unit 200 of the head lamp assembly according to an embodiment of the present disclosure. FIGS. 25 to 27 are schematic diagrams for illustrating a light distribution region additionally irradiated by the configuration of FIG. 24. And, FIG. 28 is a schematic diagram showing a beam pattern of class W implemented by the head lamp assembly according to an embodiment of the present disclosure.

A general beam pattern of class W is implemented by providing a separate second shield unit and disposing the second shield unit movable above the first shield unit so that the light reflected on a reflective surface and preceding forward is partially intercepted at its center portion by the second shield unit to lower the brightness of the light. However, as described above, since the separate second shield unit is further installed, production costs increase, and since it is implemented so that the second shield unit intercepts light, the overall quantity of light decreases.

The beam pattern of class W according to an embodiment of the present disclosure further includes the fifth shield protrusion 238 of the shield unit 200, which may be implemented by "activating" the fifth shield protrusion 238 and simultaneously changing a swivel angle of the head lamp and light power of the head lamp. In other words, the beam pattern of class W may be generated as the fifth shield protrusion 238 of the shield unit 200 is "activated." The fifth shield protrusion 238 of the shield unit 200 stands vertically so as to be located at the uppermost portion of the shield unit 200, thereby partially intercepting the light irradiated forward by the fifth shield protrusion 238.

As shown in FIG. 20, the rotation control unit (not shown) for rotating the head lamp 10 in the right and left direction to activate the fifth shield protrusion 238 and simultaneously determine the irradiating direction of the head lamp 10 rotates the left head lamp to the left so that its angle θ1 changes by a predetermined angle to the left, and rotates the right head lamp to the right so that its angle θ2 changes to the right by a predetermined angle. By rotating the right and left head lamps to be apart from each other to reduce the quantity of light at the center portion, the light reflection prevention region 27 may be formed as described later to implement the beam pattern of class W.

When the beam pattern of class W is implemented, the fifth shield protrusion 238 may be further provided to realize the beam pattern of class W. However, in addition to the above, since the beam pattern of class W is similar to the beam pattern of class E except for the light reflection prevention region 27, as described above with reference to FIG. 9c, the fourth shield protrusion 236 corresponding to the beam pattern of class E may be activated and used instead without the fifth shield protrusion 238, and the fifth shield protrusion 238 may be excluded. In addition, the second shield protrusion 232 corresponding to the beam pattern of class C may be activated to implement the beam pattern of class W.

It is also possible that different shield protrusions are activated at the right and left head lamps. When the beam pattern of class W is implemented, the right and left head lamps are rotated to be apart from each other as described above in this embodiment. At this time, the head lamp toward an opposite lane, namely the left head lamp in a RHD road, rotates toward the opposite lane by a predetermined angle. Therefore, the shield protrusions corresponding to the beam patterns of class C, E and W having relatively long irradiation distances of the beam pattern may be activated, and accordingly the light irradiated from the left head lamp may dazzle a driver of an oncoming vehicle, which may cause a traffic accident or the like. To prevent this, regarding the light irradiated from the head lamp toward the opposite lane, the third shield protrusion 234 corresponding to the beam pattern of class V which has a shortest irradiation distance among the beam patterns may be activated to prevent the driver of the oncoming vehicle from being dazzled. In other words, the third shield protrusion 234 is activated at the left head lamp in a RHD country, and one of the second, fourth and fifth shield protrusions 232, 236 and 238 is activated at the right head lamp to meet light distribution regulations associated with class W.

FIGS. 21 to 23 are schematic diagrams showing light irradiation regions and distribution of light irradiation caused by the head lamp assembly according to an embodiment of the present disclosure, where FIG. 21 shows the case in which the left head lamp irradiates light, FIG. 22 shows the case in which the right head lamp irradiates light, and FIG. 23 shows the case in which both right and left head lamps irradiate light.

Referring to FIG. 21, it could be understood that the central axis (light axis) of the light source is present at a location biased to the left by a predetermined angle from the 0 (zero) degree reference line of the horizontal axis, and it could be understood that the circular shape is gradually spreading from the light axis. It means that stronger light reaches as the circle is smaller, and if the circular shape increases, it may be recognized that the light gradually spreads out to the surrounding from the light axis.

Similarly, referring to FIG. 22, it could be understood that the light axis which is a central region of light distribution is rotated to the right by a predetermined angle based on a reference line OL at the center of the horizontal axis. FIG. 23 shows light distribution in the case where the right and left lamps are merged. It could be understood that the light distribution center region is located according to the right and left head lamps. If the light distribution region is formed as above, since the region of Segment 10 and 20 according to the light distribution regulations of FIG. 1 to prevent a driver of an oncoming vehicle from being dazzled in the rain is spaced apart from the right and left light axes by a predetermined distance to irradiate light with a relatively low intensity as described above, the head lamps may be configured to irradiate light not greater than the maximum intensity of illumination regulated in the law without any separate additional light intercepting structure.

FIG. 24 comparatively shows cross-sectional shapes of the second shield protrusion 232 (also referred to as the "shield protrusion A") and the fifth shield protrusion 238. The fifth shield protrusion 238 (also referred to as the "shield protrusion B") for forming the beam pattern of class W or E has a cross-sectional shape similar to that of the second shield protrusion 232 for forming the beam pattern of class C as a whole, except that locations where steps protruding upward start are different. In other words, while the location where the step protruding upward starts at the second shield protrusion 232 is a middle point in the length direction (the horizontal direction on the figure) of the second shield protrusion, the location where the step protruding upward is formed at the fifth shield protrusion 238 for forming the beam pattern of class W is biased toward the step by a distance D in comparison to the second shield protrusion 232. As described above, when the right and left head lamps are rotated by a predetermined angle to be apart from each other, the quantity of light oriented to the front decreases. Therefore, the above configuration reduce the region intercepting a high beam as much as the step D to open a part of the region intercepting the high beam so that the high beam is partially irradiated forward, thereby compensating the reduced intensity of illumination.

This will be described in detail with reference to FIGS. 25 to 27. FIG. 25 shows the light distribution region when the high beam is irradiated, where the beam pattern formed without an activated shield protrusion is identical to the above. As shown in FIG. 26, in the case where a shield protrusion, for example the second shield protrusion 232 corresponding to class C, is activated to intercept the high beam, the high beam is mostly intercepted, and particularly, the light with highest intensity, irradiated at the light axis which is the center portion is nearly almost intercepted. At this time, since the right and left head lamps are rotated to be apart from each other to implement the beam pattern of class W, the intensity of illumination is further reduced.

Therefore, in order to compensate the intensity loss caused by the rotation as described above, the region is opened as much as the step D as shown in FIG. 28 so that the high beam passes more. In other words, the fifth shield protrusion 238 corresponding to the beam pattern of class W allows more light to pass forward as compared to the second shield protrusion 232. In particular, the part of the high beam intercepted by the shield protrusion may be irradiated forward as the shield protrusion is opened as much as the distance D, thereby increasing the intensity of illumination. In particular, as the light distribution region of the central portion with the highest intensity of illumination is opened, the intensity loss caused by the rotation of the head lamps may be compensated.

Therefore, the Emax light distribution region which needs the increase of the intensity of illumination and Segment 10 and 20 which needs the decrease of the intensity of illumination may be implemented simultaneously as described above with reference to FIGS. 1 and 2. In other words, in the case where the right and left head lamps are rotated to be apart from each other, Segment 10 and 20 which is a regulation to prevent dazzling may be satisfied, and the Emax light distribution region relatively adjacent to the high beam may satisfy the intensity of illumination regulated in the light distribution law due to the quantity of light increasing as much as the step D.

As described above, the fifth shield protrusion 238 for forming the beam pattern of class W is activated, and the head lamps are rotated. Simultaneously, the light power of the lighting unit 11 of the right and left head lamps 10 may be further controlled. As described above, in addition to opening the high beam as much as the step D to compensate the intensity of illumination, the light power of the right and left head lamps may be controlled to adjust the intensity of illumination. In other words, since the left head lamp is swiveled to the left by a predetermined angle, the existing light power is reduced by a predetermined energy to control the quantity of light. This is for preventing a driver of an oncoming vehicle from being dazzled. Meanwhile, since the right head lamp is swiveled to the right by a predetermined angle, it does not give a serious influence on a driver of a preceding vehicle in different lanes. Therefore, the light power supplied to the lighting unit 11 of the right head lamp increases by a predetermined power to compensate the quantity of light to the front which is lowered as the light power of the left head lamp decreases, and thereby the quantity of light is suitably maintained.

As described above, the head lamp assembly according to an embodiment of the present disclosure adds the fifth shield protrusion 238 to the existing shield unit 200 and activates the fifth shield protrusion 238, rotates the right and left head lamps to be apart from each other, and controls the quantity of light of the right and left head lamps individually, thereby forming the light reflection prevention region 27 of FIG. 28 so that the beam pattern of class W may be easily implemented, even though a component for implementing the beam pattern of class W is not separately provided.

Heretofore, the head lamp assembly according to an embodiment of the present disclosure has been on the assumption that the head lamp assembly is used in a RHD country. However, the present disclosure is not limited thereto, and it is apparent to those having ordinary skill in the art that the configuration of the head lamp assembly and the configuration of the right and left head lamps may be reversed in a LHD country such as Japan.

Figure 29:
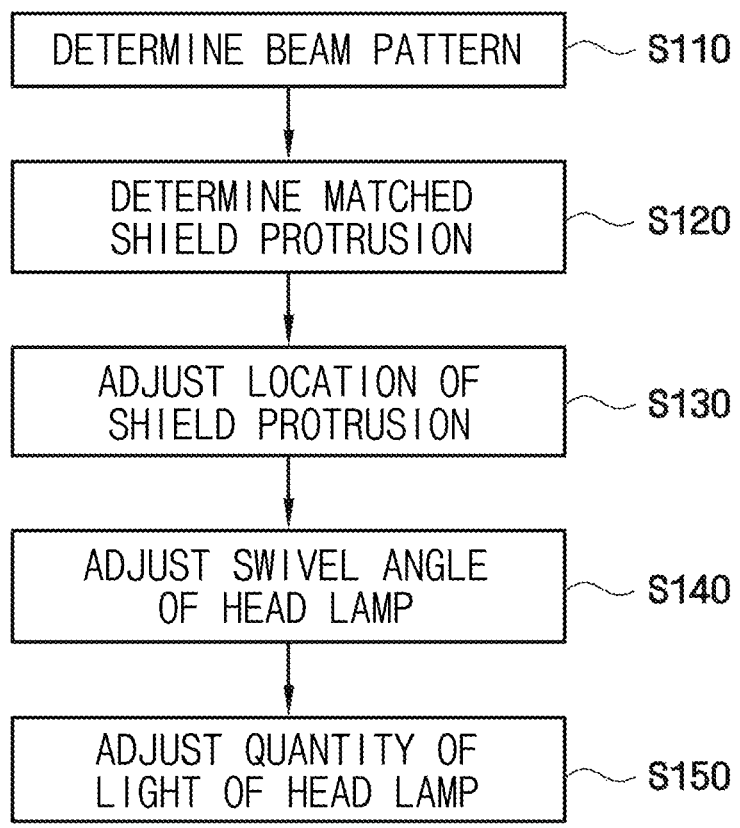
FIG. 29 is a flowchart for illustrating a method for controlling the head lamp assembly according to an embodiment of the present disclosure.
Figure 30:
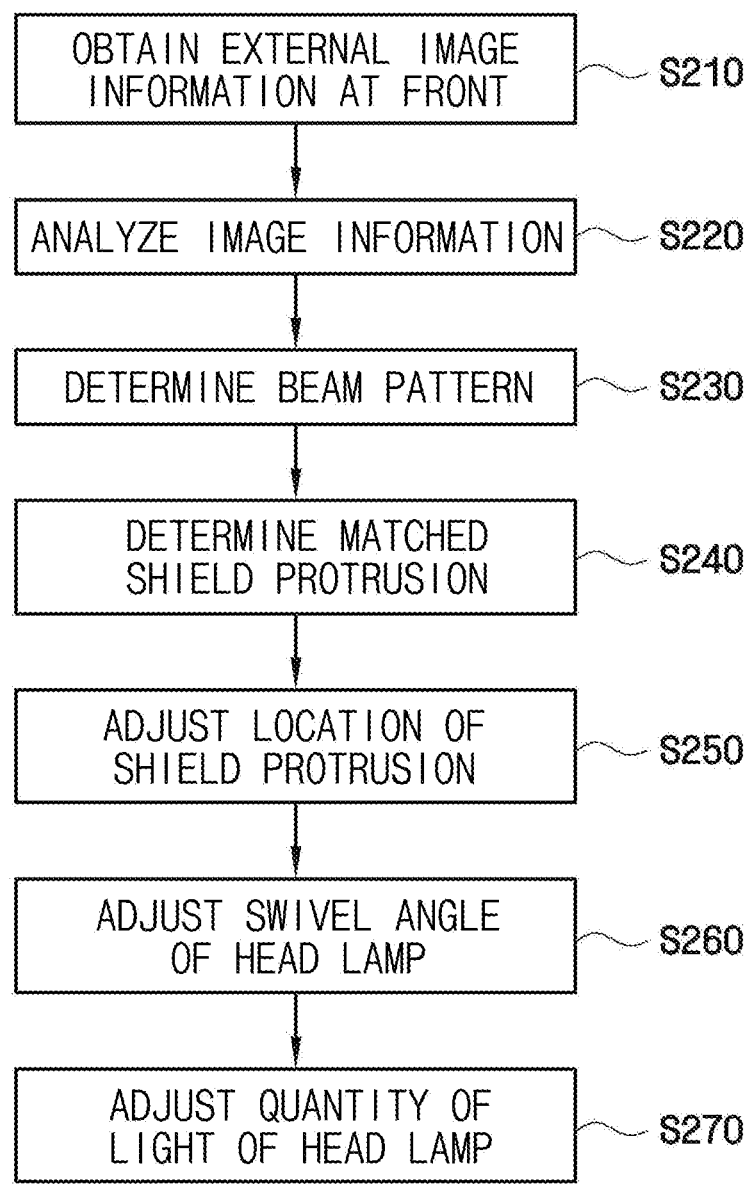
FIG. 30 is a flowchart for illustrating a method for controlling the head lamp assembly according to another embodiment of the present disclosure.

Hereinafter, a method for controlling the head lamp assembly according to the embodiments of the present disclosure will be described with reference to FIGS. 29 and 30. In particular, those embodiments will be described based on different points while duplicated description will be omitted. FIG. 29 is a flowchart for illustrating a method for controlling a head lamp assembly according to an embodiment of the present disclosure, and FIG. 30 is a flowchart for illustrating a method for controlling a head lamp assembly according to another embodiment of the present disclosure.

The method for controlling a head lamp assembly according to an embodiment of the present disclosure includes determining a beam pattern of a head lamp, determining a shield protrusion corresponding to the beam pattern from a plurality of shield protrusions, moving the shield protrusion to a predetermined location, controlling a rotation angle of the head lamp, and controlling the quantity of light of the head lamp.

First, a beam pattern of the head lamp is determined (S110). As described above, the beam pattern of the head lamp includes class H, class RHD C, class C, class V, class E and class W.

Class H is a beam pattern which is called a high beam irradiating light to a long distance, and this beam pattern is suitable for an environment where a vehicle runs fast with no preceding vehicle. Class RHD C is a beam pattern used when a road driving circumstance changes from right-hand drive to left-hand drive. Class C is a beam pattern suitable for the case when a vehicle runs on a country road or when it is not needed to apply a beam pattern of another mode since there is no special situation, wherein, compared with a general low beam, this pattern improves the quality of light to some extent while ensuring a sight to an opposite lane. Class V is a beam pattern suitable for the case where the vehicle runs under a circumstance ensuring brightness of surrounding lighting to some extend such as in a downtown. Class E is a beam pattern suitable for the case where the vehicle runs on a highway or on a road which is straight for a significant distance, wherein class E gives a somewhat longer sight to the front in comparison to class C. Class W is an in-rain driving mode, which is a beam pattern suitable for the case where the vehicle runs in a rainy weather or on a wet road, wherein the long-distance front sight is somewhat similar to class E, but the quantity of light rather decreases till near 10 to 20 m in order to reduce reflective glare.

Among the various beam patterns as above, a driver of the vehicle determines a beam pattern suitable for the circumstance of a road on which the vehicle runs and manipulates a stick or button to set a desired beam pattern mode.

As shown in FIG. 30, in a method for controlling a head lamp assembly according to another embodiment of the present disclosure, the step of determining a beam pattern may further include obtaining front image information (S210), determining situation of a road based on the front image information (S220), and determining a beam pattern from the plurality of beam pattern based on the situation of the road (S230). In the step (S210) of obtaining front image information, the front image information may be information about a front road such as rain information notifying whether it rains on the front road. In addition, in the step (S220) of determining a situation of a road, the situation of the road may be a rainy situation on the road which is derived from the rain information. The rain information may be detected by a rain sensor provided at the vehicle, or the rain information may be obtained by recognizing that a wafer of the vehicle is operating over a predetermined time.

In other words, if the driver directly determines the beam pattern, the driver should manipulate a beam pattern setting unit one by one to change the beam pattern whenever a road condition or situation varies, and so it is a very cumbersome work and it may be difficult to suitably irradiate light from the head lamps timely. Therefore, an image providing unit including camera modules may be separately provided at front and rear sides of the vehicle to obtain front and rear image information in the driving direction, and the front road information may be extracted based on the obtained image information so that a beam pattern suitable for the front road may be automatically determined. The image information may include at least one of a shape of a front road, a location of a preceding vehicle, a location of an oncoming vehicle, weather information, and the kind of a road on which the vehicle runs.

In addition, a method for detecting a situation of a front road without an image providing unit may also be used. In other words, an illumination intensity sensor attached to the vehicle may check whether the vehicle currently runs by day or at night. For example, in the case where it is recognized based on the brightness of surrounding greater than a certain quantity of light, the shield protrusion corresponding to the beam pattern of class V which does not need a long-distance beam pattern may be activated. In addition, in the case where the wiper operates over a predetermined time, it may be checked that it rains, and so the shield protrusion corresponding to the beam pattern of class W may be activated.

Other steps of the method for controlling a head lamp assembly according to another embodiment of the present disclosure are identical to the control method of the former embodiment, and so the following description will be based on the control method of the former embodiment, and duplicated descriptions will be excluded.

The method for controlling a head lamp assembly according to an embodiment of the present disclosure will be described with reference to FIG. 29. Next, among the plurality of shield protrusions, a shield protrusion corresponding to the beam pattern is determined (S120). As described above, it is possible that the beam pattern of class C matches with the second shield protrusion and the beam pattern of class W matches with the fifth shield protrusion. However, the present disclosure is not limited thereto, and the arrangement order of shield protrusions may be changed. In addition, class W and class E having similar beam patterns may be implemented by a single shield protrusion.

In addition, different shield protrusions may be actuated at the right and left head lamp. As described later, when the beam pattern of class W is implemented, in this embodiment, the right and left head lamp are rotated to be apart from each other, and at this time, the head lamp toward an opposite lane, for example the left head lamp on a RHD road, is rotated toward the opposite lane by a predetermined angle. Therefore, in the case where the left head lamp irradiates light according to the beam patterns of class C, E and W which have a relatively long irradiation distance, the irradiated light may dazzle a driver of the oncoming vehicle, which may cause a traffic accident or the like. In order to prevent this, the third shield protrusion 234 corresponding to class V whose irradiation distance is shortest among the beam patterns may be activated so as to prevent the light irradiated from the head lamp toward the opposite lane from dazzling the driver of the oncoming vehicle.

Meanwhile, in order to form the beam pattern of class W, the other head lamp, namely the head lamp toward the driving lane may activate the fifth shield protrusion 238 corresponding to class W so that the light distribution regulations associated with the beam pattern of class W may be satisfied. In addition, even though a shield protrusion corresponding to class W is not separately provided, the light distribution regulations associated with the beam pattern of class W may be satisfied by activating the shield protrusion corresponding to class E whose beam pattern is similar to that of class W. Furthermore, the light distribution regulations associated with the beam pattern of class W may be satisfied by activating the second shield protrusion 232 corresponding to class C.

Figure 31:
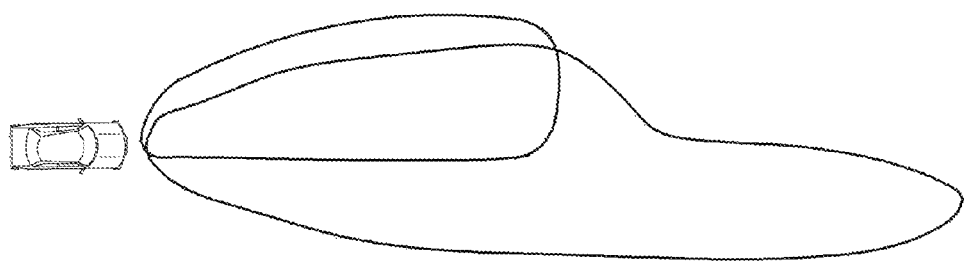
FIGS. 31a and 31b are schematic diagrams showing a beam pattern of class W implemented by the method for controlling the head lamp assembly according to the embodiments of the present disclosure.
Figure 31:
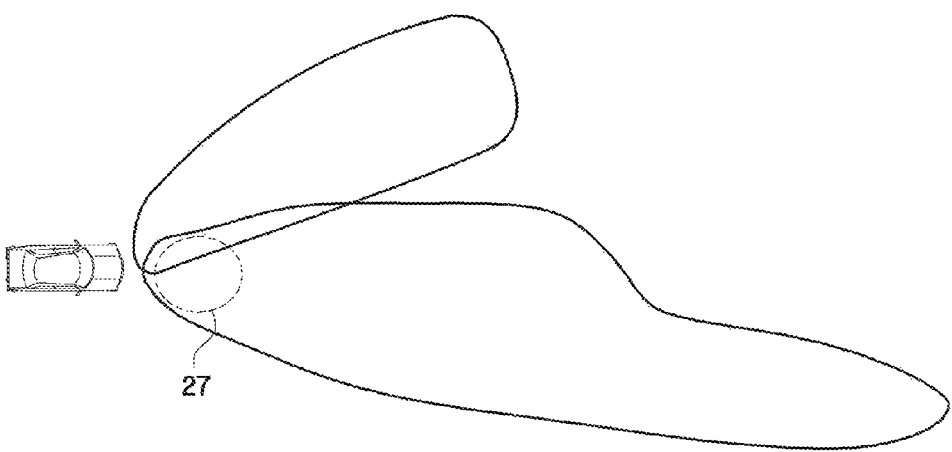

For example, as shown in FIG. 31a, in a RHD country, the left head lamp activates the shield protrusion corresponding to class V, and the right head lamp activates the shield protrusion corresponding to class C, and simultaneously the right and left head lamps are rotated to be apart from each other as shown in FIG. 31b to implement the beam pattern corresponding to class W. In this case, as shown in the figure, the intensity of illumination of the light reflection prevention region 27 decreases so that a beam pattern corresponding to class W may be formed, which may satisfy the corresponding light distribution regulations.

Next, the shield protrusion selected in the former step is moved to a predetermined location (S130). For example, in the case where the shield protrusion is a cylindrical shield unit formed on the circumferential surface, the shield unit is rotated to activate a desired shield protrusion.

Next, the rotation angle of the head lamp is controlled, and the quantity of light of the head lamp is controlled (S140, S150). As described above, adjusting the rotation angle and light power of the head lamp to control the brightness of the head lamp may be limited to class W, and, if another beam pattern is selected, the subject steps may be omitted. In other case, the head lamps may also be controlled to have different rotation angles and different quantities of light according to the determined beam pattern. In addition, the rotation angles of the right and left head lamps may be different from each other, and the increasing or decreasing light powers of the right and left head lamps may also be different from each other.

Figure 32:
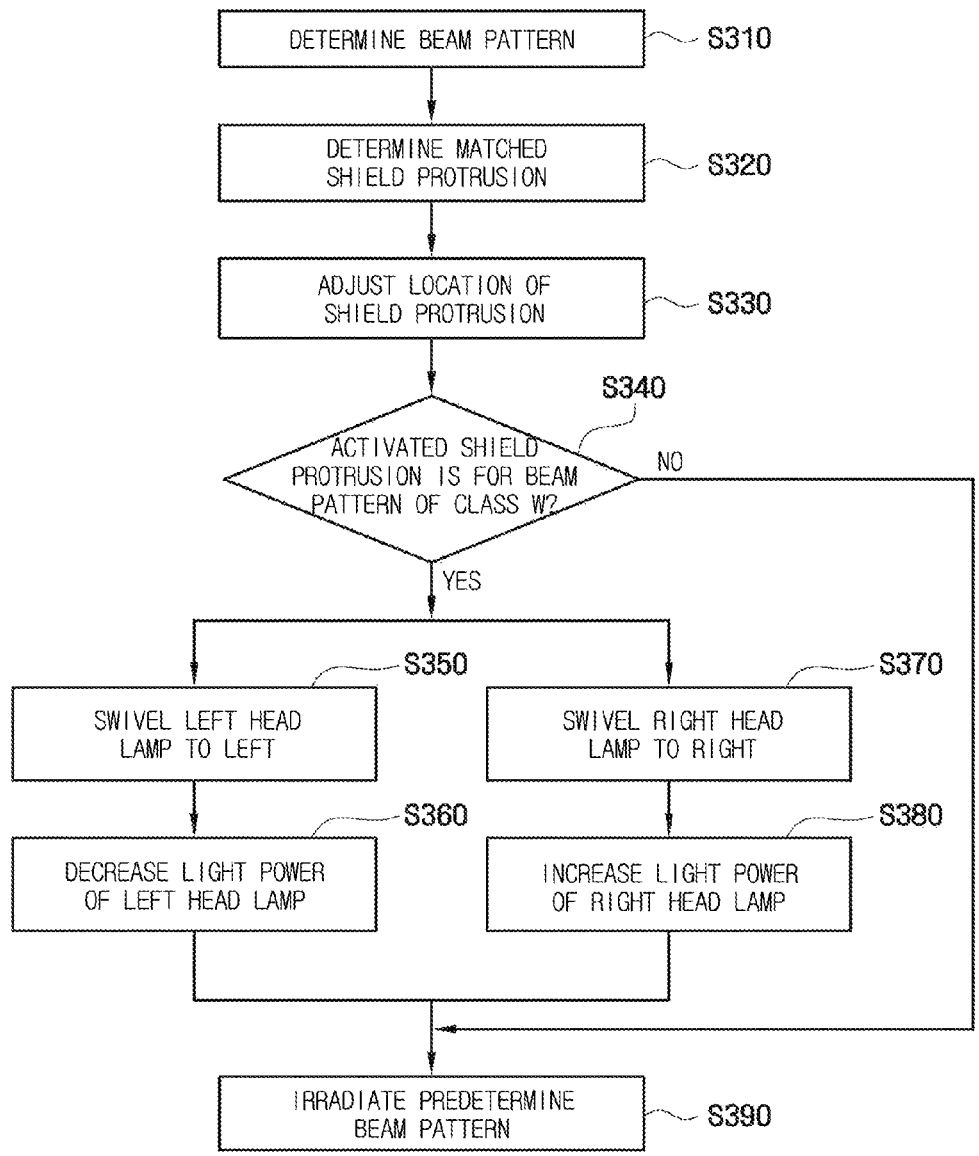
FIG. 32 is a flowchart for illustrating an operation order of the method for controlling the head lamp assembly according to the embodiments of the present disclosure in case where the beam pattern is class W.

Hereinafter, in the method for controlling a head lamp assembly according to an embodiment of the present disclosure, the operation order in the case where the beam pattern is class W will be described in detail with reference to the flowchart of FIG. 32.

First, a beam pattern of the head lamp is determined (S310), a shield protrusion corresponding to the beam pattern is determined from a plurality of shield protrusions (S320), and the shield protrusion is moved to a predetermined location (S330). As described above, in order to implement the beam pattern of class W, the shield protrusions to be activated at the right and left head lamp may be determined differently from each other. In particular, in order to implement the beam pattern of class W, the third shield protrusion 234 may be selected for the head lamp toward an opposite lane, and one of the second, fourth and fifth shield protrusions 232, 236 and 238 may be selected for the other head lamp. In the case where there is no oncoming vehicle such as on a one-way street, the same shield protrusion may be selected to be activated for the right and left head lamps. This is already described above, and therefore duplicated descriptions will be omitted.

Next, it is determined whether the shield protrusion is for a beam pattern of class W (S340), and if the shield protrusion is not for a beam pattern of class W, the controlling process ends, and the selected predetermined beam pattern is irradiated (S390).

Meanwhile, if the activated shield protrusion is for forming the beam pattern of class W, the left head lamp is rotated to the left by a predetermined angle (S350), and the light power of the left head lamp decreases by a predetermined quantity (S360). The rotation angle and light power may be adjusted differently depending on the kind of the shield protrusion selected by the right and left head lamp. In addition, in the case where the activated shield protrusion is for forming the beam pattern of class W, the right head lamp is rotated to the right by a predetermined angle (S370), and the light power of the right head lamp increases by a predetermined quantity (S380).

By using the method for controlling the head lamp assembly according the embodiments of the present disclosure, the swivel angle and light power of the right and left head amps are individually controlled while activating a desired shield protrusion, without adding a separate component, and so it is possible to easily implement various beam patterns, particularly the beam pattern of class W which is an in-rain driving mode. In addition, since there is no need of a separate light intercepting structure when implementing the beam pattern of class W, the quantity of light irradiated forward does not decrease, and so the operability to the front road surface is maintained so that the front may be easily recognized, thereby reducing the risks of traffic accidents.

Reference throughout this specification to "the embodiment," "this embodiment," "the previous embodiment," "one embodiment," "an embodiment," "a preferred embodiment" "another preferred embodiment" or similar language means that a particular feature, structure, or characteristic described in connection with the embodiment is included in at least one embodiment of the present disclosure. Thus, appearances of the phrases "in the embodiment," "in this embodiment," "in the previous embodiment," "in one embodiment," "in an embodiment," "in a preferred embodiment," "in another preferred embodiment," and similar language throughout this specification may, but do not necessarily, all refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

While the present disclosure has been described in connection with certain exemplary or specific embodiments, it is to be understood that the disclosure is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the disclosure.

What is claimed is:

1. A head lamp assembly comprising:
   a rotation control unit for determining irradiating directions of a pair of head lamps individually controlled;
   a lighting unit provided in each of the head lamps to generate light;
   a shield unit located at the front of the lighting unit to be rotatable on a rotary shaft and having a plurality of shield protrusions for partially intercepting the light; and
   a shield operating unit for rotating the shield unit to displace the plurality of shield protrusions to desired locations and thereby activate a selected shield protrusion so as to form a predetermined beam pattern corresponding to surrounding situations;

wherein the predetermined beam pattern includes class C, class V, class E and class W, wherein the plurality of shield protrusions have different shapes from each other, wherein a part of the plurality of shield protrusions have steps, wherein the plurality of shield protrusions includes a shield protrusion A of which a step starting portion protruding upward is formed in a middle point in the length direction of the shield, and a shield protrusion B of which a step starting portion protruding upward is formed biased toward the step from the middle point, and wherein the beam pattern of class W is formed by rotating the pair of head lamps to be apart from each other.

2. The head lamp assembly according to claim 1 wherein shield protrusion B allows more light to pass in comparison to the shield protrusion A.

3. The head lamp assembly according to claim 1 wherein the shield protrusion A corresponds to the beam pattern of class C.

4. The head lamp assembly according to claim 1 wherein the shield protrusion B corresponds to the beam pattern of class W or class E.

5. The head lamp assembly according to claim 1 wherein the predetermined beam pattern is formed by activating different shield protrusions at the pair of head lamps.

6. The head lamp assembly according to claim 1 wherein the beam pattern of class W is formed by activating, among the plurality of shield protrusions, a shield protrusion corresponding to the beam pattern of class V at one of the pair of head lamps, and activating, among the plurality of shield protrusions, a shield protrusion corresponding to the beam pattern of class W at the other of the pair of head lamps.

7. The head lamp assembly according to claim 1 wherein the shield operating unit further includes a driving unit for providing a driving force, and the shield operating unit further includes a driving gear unit for transmitting the driving force of the driving unit to the shield unit.

8. The head lamp assembly according to claim 1 wherein the lighting unit is configured so that the generated quantity of light is adjustable.

9. A head lamp assembly, comprising:
a rotation control unit for determining irradiating directions of a pair of head lamps individually controlled;
a lighting unit provided in each of the head lamps to generate light;
a shield unit located at the front of the lighting unit to be rotatable on a rotary shaft and having a plurality of shield protrusions for partially intercepting the light; and
a shield operating unit for rotating the shield unit to displace the plurality of shield protrusions to desired locations and thereby activate a selected shield protrusion so as to form a beam pattern of class W for controlling reflective glare in the rain,
wherein the plurality of shield protrusions have different shapes from each other,
wherein a part of the plurality of shield protrusions have steps,
wherein the pair of head lamps are rotated to be apart from each other to form the beam pattern of class W.

10. The head lamp assembly according to claim 9 wherein one of the part of plurality of shield protrusions having steps is activated at one of the pair of head lamps, and one of shield protrusions except for the shield protrusions having steps is activated at the other head lamp.

11. The head lamp assembly according to claim 10 wherein the other head lamp is rotated with a greater rotation angle than one head lamp.

12. The head lamp assembly according to claim 10 wherein driving currents applied to one head lamp and the other head lamp are different from each other.

13. The head lamp assembly according to claim 12 wherein a driving current applied to one head lamp is smaller than a driving current applied to the other head lamp.

14. The head lamp assembly according to claim 9 wherein the pair of head lamps are rotated with different rotation angles.

15. A method for controlling a head lamp assembly having a pair of headlamps comprising:
determining a beam pattern of one head lamp;
determining a shield protrusion corresponding to the beam pattern, from a plurality of shield protrusions;
moving the shield protrusion to a predetermined location;
adjusting a rotation angle of one head lamp; and
adjusting the quantity of light of one head lamp;
wherein, in said adjusting of a rotation angle of one head lamp, the head lamps are rotated to be apart from each other.

16. The method for controlling a head lamp assembly according to claim 15 wherein said determining of a beam pattern includes:
obtaining rain information;
determining a rain situation of a road based on the rain information; and
determining one of the plurality of beam patterns based on the rain situation of the road.

17. The method for controlling a head lamp assembly according to claim 16 wherein the rain information is obtained by using a rain sensor or by detecting an operation of a vehicle wiper.

18. The method for controlling a head lamp assembly according to claim 16 wherein the plurality of beam pattern includes class C, class V, class E and class W.

19. The method for controlling a head lamp assembly according to claim 15 wherein said adjusting of the quantity of light is performed differently according to the determined beam pattern.

20. A method for controlling a head lamp assembly having a pair of headlamps comprising:
determining a beam pattern of a head lamp;
determining a shield protrusion corresponding to the beam pattern, from a plurality of shield protrusions;
moving the shield protrusion to a predetermined location;
determining whether the shield protrusion is for a beam pattern of class W;
rotating a left one of the head lamps to the left by a predetermined angle and decreasing a light power of the left head lamp in the case where the shield protrusion is for a beam pattern of class W; and
rotating a right one of the head lamps to the right by a predetermined angle and increasing a light power of the right head lamp in the case where the shield protrusion is for a beam pattern of class W.

21. The method for controlling a head lamp assembly according to claim 20 wherein the predetermined angle of the left head lamp and the predetermined angle of the right head lamp are different from each other.

22. The method for controlling a head lamp assembly according to claim 20 wherein the decreasing light power of the left head lamp and the increasing light power of the right head lamp are different from each other.

23. The method for controlling a head lamp assembly according to claim 20 wherein said determining a beam pattern includes:
obtaining rain information;
determining a rain situation of a road based on the rain information; and
determining one of the plurality of beam patterns based on the rain situation of the road.

24. The method for controlling a head lamp assembly according to claim 23 wherein the rain information is obtained by using a rain sensor or by detecting an operation of a vehicle wiper.

25. The method for controlling a head lamp assembly according to claim 23 wherein the plurality of beam pattern includes class C, class V, class E and class W.

26. The method for controlling a head lamp assembly according to claim 20 wherein said adjusting of the quantity of light is performed differently according to the determined beam pattern.

27. A head lamp assembly comprising:
a rotation control unit for determining irradiating directions of a pair of head lamps individually controlled;
a lighting unit provided in each of the head lamps to generate light;
a shield unit located at the front of the lighting unit to be rotatable on a rotary shaft and having a plurality of shield protrusions for partially intercepting the light; and
a shield operating unit for rotating the shield unit to displace the plurality of shield protrusions to desired locations and thereby activate a selected shield protrusion so as to form a beam pattern of class W for controlling reflective glare in the rain;
wherein the plurality of shield protrusions have different shapes from each other,
wherein a part of the plurality of shield protrusions have steps, and
wherein the beam pattern of class W is formed by activating a shield protrusion having a step at one of the pair of head lamps and activating a shield protrusion having no step at the other of the pair of head lamps.

28. The head lamp assembly according to claim 27 wherein the beam pattern of class W increases a light power supplied to a lighting unit of one of the head lamps.

29. The head lamp assembly according to claim 27 wherein the beam pattern of class W decreases a light power supplied to a lighting unit of the other of the head lamps.

30. The head lamp assembly according to claim 27 wherein the beam pattern of class W is formed by activating, among the plurality of shield protrusions, a shield protrusion corresponding to the beam pattern of class V at one of the pair of head lamps, and activating, among the plurality of shield protrusions, a shield protrusion corresponding to the beam pattern of class W at the other of the pair of head lamps.

31. A method for controlling a head lamp assembly having a pair of headlamps comprising:
determining a beam pattern of one head lamp;
determining a shield protrusion corresponding to the beam pattern, from a plurality of shield protrusions;
moving the shield protrusion to a predetermined location;
adjusting a rotation angle of one head lamp; and
adjusting the quantity of light of one head lamp, wherein, in said determining of a shield protrusion, in the case where the determined beam pattern is class W, one of the head lamps is determined to activate a shield protrusion corresponding to class V, and the other of the head lamps is determined to activate a shield protrusion corresponding to class C, class E or class W.

* * * * *